United States Patent [19]

Woodruff

[11] 4,224,347
[45] Sep. 23, 1980

[54] PROCESS AND PACKAGE FOR EXTENDING THE LIFE OF CUT VEGETABLES

[75] Inventor: Richard E. Woodruff, Salinas, Calif.

[73] Assignee: TransFRESH Corporation, Salinas, Calif.

[21] Appl. No.: 45,881

[22] Filed: Jun. 8, 1979

Related U.S. Application Data

[63] Continuation-in-part of Ser. No. 917,929, Jun. 22, 1978, abandoned.

[51] Int. Cl.³ .................... B65D 81/24; B65B 25/04; B65B 31/02
[52] U.S. Cl. .................................. 426/106; 422/28; 422/40; 426/263; 426/270; 426/314; 426/316; 426/320; 426/415; 426/419
[58] Field of Search ............... 426/419, 410, 415, 106, 426/312, 316, 314, 418, 263, 270, 320; 422/28, 40; 99/467

[56] References Cited

U.S. PATENT DOCUMENTS

| Re. 14,489 | 6/1918 | Franks | 426/419 |
|---|---|---|---|
| 226,094 | 3/1880 | Mefford | 426/419 |
| 1,017,144 | 2/1912 | Gironcoli | 426/312 |
| 1,155,530 | 10/1915 | Wahl | 426/312 |
| 1,259,410 | 3/1918 | Kapadia | 426/419 |
| 1,578,218 | 3/1926 | Thompson | 426/419 |
| 2,490,951 | 12/1949 | Dunkley | 426/312 |
| 2,623,826 | 12/1952 | Grinstead | 426/413 |
| 2,676,943 | 4/1954 | Carson | 426/129 |
| 2,930,704 | 3/1960 | Williams | 426/316 |
| 2,955,940 | 10/1960 | Williams | 426/419 |
| 3,102,777 | 9/1963 | Bedrosian et al. | 426/419 |
| 3,122,748 | 2/1964 | Beebe | 426/129 |
| 3,450,544 | 6/1969 | Badran et al. | 426/419 X |
| 3,453,119 | 7/1969 | McGill | 426/312 |
| 3,459,117 | 8/1969 | Koch et al. | 99/467 |
| 3,507,667 | 4/1970 | Magnen | 426/419 |
| 3,574,642 | 4/1971 | Weinke | 426/129 |
| 3,630,759 | 12/1971 | Rumberger | 426/415 X |
| 3,851,080 | 11/1974 | Lugg et al. | 426/312 |
| 3,930,040 | 12/1975 | Woodruff | 426/312 |

FOREIGN PATENT DOCUMENTS

| 1935566 | 1/1970 | Fed. Rep. of Germany . |
|---|---|---|
| 457888 | 12/1936 | United Kingdom . |
| 476272 | 12/1937 | United Kingdom . |
| 715351 | 9/1954 | United Kingdom . |
| 1186978 | 4/1970 | United Kingdom . |
| 1199998 | 7/1970 | United Kingdom . |

OTHER PUBLICATIONS

53 Plant Disease Reporter No. 7, 7/69; Harding "Effect of Low Oxygen & Low Carbon Dioxide Combin in Controlled Atm. Storage".
88 American Soc. for Horticultural Science, 311 (1966), Griersson et al., "Controlled Atmosphere Storage of Florida & California Lemons".
11(2) Hortscience 114 (1976); Wild et al., "Effect of Reduced Ethylene Levels in Storage Atmospheres on Lemon Keeping Quality".
37 Journal of Food Science, pp. 802–823, (1972), Besser et al., "Change in Quality & Nutritional Compos. of Foods Preserved by Gas Exchange".

*Primary Examiner*—Steven L. Weinstein
*Attorney, Agent, or Firm*—Kendrick, Netter & Bennett

[57] ABSTRACT

To extend their shelf life, certain vegetables are placed in enclosures that are at least as permeable to carbon dioxide, carbon monoxide and oxygen as low density polyethylene that is not more than two mils thick, the atmosphere within the packages is modified to comprise at least about 25% oxygen by volume, at least about 3% carbon monoxide by volume, and the balance substantially all molecular nitrogen, and the packages are then sealed. The permeability should be sufficient to prevent the carbon dioxide concentration from rising much above 20% by volume, and to prevent the oxygen concentration from falling much below about 2% by volume.

48 Claims, No Drawings

PROCESS AND PACKAGE FOR EXTENDING THE LIFE OF CUT VEGETABLES

This application is a continuation-in-part of U.S. Pat. application Ser. No. 917,929 filed June 22, 1978, now abandoned, and entitled: "PROCESS FOR EXTENDING THE LIFE OF CUT VEGETABLES". The complete disclosure of that application is incorporated herein by reference.

This invention relates to a process for extending the useful life of vegetables such as lettuce and cabbage. More particularly, this invention relates to a process for packaging vegetables and especially cut vegetables such as lettuce and cabbage so that both the normal respiration process and resistance to microbiological damage vital to their shelf life is sustained during storage periods.

This invention provides a process for packaging vegetables such as lettuce and cabbage in sealable packages that are differentially permeable to oxygen, carbon monoxide and carbon dioxide. This process is especially effective with cut vegetables such as cut lettuce and cut cabbage. Such vegetables are sealed within packages that include an atmosphere comprising, upon sealing, an oxygen concentration substantially higher than about 21% by volume, and a carbon monoxide concentration of at least about 3% by volume. The balance of the atmosphere within the package is substantially all molecular nitrogen.

The package must have permeabilities to oxygen, carbon monoxide, and carbon dioxide that are at least those of low density polyethylene having a thickness of not more than about 2 mils. Such polyethylene typically has a permeability to oxygen of at least about 500 cc per 100 square inches per 24 hours per mil and a permeability to carbon dioxide of at least about 1,350 cc per 100 square inches per mil, as determined under ASTM test method D1434-66. Preferably, the package is made of sheet material such as high density polyethylene, low density polyethylene, or polyethylene modified with other materials such as ethylene vinyl acetate or Surlyn. Such packaging should be strong enough to withstand damage resulting from handling and shipping and sufficiently transparent to see the condition of the vegetables within them. It should also be sufficiently permeable to oxygen and carbon dioxide to prevent its carbon dioxide content from reaching too high a concentration, or its oxygen concentration within them from falling too low. This prevents the onset of anaerobic conditions, formation of slime or other undesirable substances on vegetables surfaces, and other undesirable effects such as the creation of off flavors and aromas in the vegetables. These effects are best achieved where the packages and their contents are maintained at temperatures within the ranges referred to below.

The package may vary in size from individual consumer size, say a few ounces or pounds, to pallet-sized packages having a capacity of many hundreds of pounds.

Among the vegetables that benefit from this new process are celery, green onions, broccoli, cauliflower, parsley, lettuce and cabbage. Cut vegetables in particular benefit from the new process. Shredded and chopped lettuce are examples of such cut vegetables.

The vegetables are preferably stored and shipped at temperatures below 40° F. and more preferably at temperatures below 35° F. but above the freezing point of the moisture in the vegetables. A preferred temperature range for storage and shipment of such vegetables is from about 29° F. to about 45° F. Above 45° F., formation of slime, other microbiological disorders, and undesirable odors and flavors in the vegetables begins and progresses rapidly.

Preferably, the packages used in the process of this invention are made from sheet material composed of one or more thermoplastics such a high density polyethylene, low density polyethylene, polyethylene blended with ethylene vinyl acetate, polyethylene blended with Surlyn, or other thermoplastics having the necessary permeability characteristics. Normally, permeability of a given thermo-plastic decreases proportionately as its thickness increases. Thus, high density polyethylene sheet measuring 1 mil in thickness is ordinarily three times as permeable as sheet made of the same polyethylene but having a thickness of three mils.

The atmosphere to be confined within the packages containing the vegetables must include a higher initial concentration of oxygen than 21% by volume. Therefore, that atmosphere will include at least about 25% by volume oxygen, more preferably at least about 40-50% oxygen by volume. The atmosphere must also include at least about 3% carbon monoxide by volume, more preferably at least about 10% carbon monoxide by volume. The balance of the atmosphere within the package is substantially all molecular nitrogen.

After the vegetables have been packaged with the modified atmosphere sealed within them, the respiration process which the vegetables undergo reduces the oxygen concentration and increases the carbon dioxide concentration. Increasing the oxygen concentration in the packages before sealing them delays substantially the onset of anaerobic or near anaerobic conditions within the package. Package permeability, properly selected, permits sufficient diffusion of oxygen into the package and sufficient carbon dioxide to escape from the package to prevent the carbon dioxide concentration from rising much above 20–25% by volume.

The carbon monoxide initially added to the package suppresses undesirable color changes that might otherwise occur in the vegetables because of the increased oxygen concentration in the package. In the absence of the increased oxygen concentration used in this process, such addition of carbon monoxide might well be expected to adversely affect the flavor and aroma of the vegetables, because oxygen concentration decreases and carbon dioxide concentration increases in sealed packages. The increase in oxygen concentration that our process requires substantially prevents this undesirable result. But the resulting increase in storage life with minimal loss in flavor, aroma and undesirable color change from the process of this invention is a combination of desirable results unachieved in the packaging industry today. Indeed, that industry relies upon near anaerobic packaging, with its attendant poor product quality after storage periods.

The following examples illustrate that vegetables and especially cut vegetables sealed within packages with modified atmospheres according to this invention maintain color, flavor and appearance, while sealed, longer than they otherwise could. These vegetables also retain these desirable characteristics even after the package has been opened.

Unless otherwise stated in the examples, all gas concentrations are stated in percentages by volume.

EXAMPLE I

Chopped head lettuce, variety Salinas, was cut to a mean size of about one-half inch and the cut lettuce was divided into six samples labeled A, B, C, D, E and F. These groups were placed in separate low-density polyethylene bags measuring twelve by twenty-four inches, and having side wall thicknesses of approximately 1.5 mils. Such bags have a permeability to carbon dioxide of 1350 cc per 100 square inches per 24 hours per mil, and a permeability to oxygen of 500 cc per square inches per 24 hours per mil.

Sample bag A was sealed and stored at 35° F. After 1 day, the oxygen concentration within the sample A bag was about 7%, the carbon dioxide concentration, about 5%. After 5 days, oxygen concentration fell to about 4%, and carbon dioxide concentration rose to about 11%. Thereafter, carbon dioxide concentration varied between about 10% and about 15%; oxygen concentration, between about 2% and 5%. In sample F, oxygen concentration was about 5% after 1 day, and about 2% after 3 days; carbon dioxide, about 5% after 1 day, about 10% after 2 days, and about 15% after 4 days. Thereafter, oxygen concentration stayed below about 4%; carbon dioxide concentration varied between about 15% and 17%.

The atmosphere within the sample B bag was modified to comprise initially about 12% oxygen, about 27% carbon monoxide, and the balance substantially all nitrogen. The bag was then sealed and stored at 35° F. After one day, the oxygen concentration was about 4%, after 6 days, about 1%. Carbon monoxide concentration within the bag fell to about 25% in one day, to about 20% in 5 days, to about 15% in 7 days, to about 10% in 15 days, and to about 5% in 17 days. Carbon dioxide concentration rose to about 5% in 1 day, to about 10% in 5 days, to about 15% in 6 days, and to about 20% in 11 days.

Sample C was sealed in a bag with a modified atmosphere comprising about 24% carbon monoxide, about 21% oxygen, and the balance substantially all nitrogen. Upon storage at 35° F., the oxygen concentration dropped to about 15% in 4 days, to about 10% in 5 days, to about 1% in 6 days, and remained there for 13 days afterward. Carbon monoxide concentration dropped to about 20% in 2 days, to about 15% in 8 days, to about 10% in 15 days, to about 5% in 17 days, and to zero 5 days later. The carbon dioxide concentration rose to about 5% in 1 day, to about 10% in 5 days, to about 15% in 7 days, and to about 20% in 13 days. Thereafter, its concentration remained at about 20% for the next 7 days.

Sample D was sealed in a package with an atmosphere initially comprising an oxygen concentration of about 12%, a carbon monoxide concentration of about 17%, and the balance substantially all nitrogen, and was maintained at 40° F. for 20 days after sealing. By the third day, the oxygen concentration had dropped to near zero percent, and stayed there for the balance of the test period. The carbon monoxide concentration dropped to about 15% in 3 days, to about 10% in 5 days, and remained there for 13 days before gradually falling to zero by the end of the test period. Carbon dioxide concentration rose to about 5% in 1 day, to about 10% in 2 days, to about 15% in 4 days, to about 20% in 9 days, and to about 23% in 14 days, before gradually declining to about 17%.

Sample E, maintained at 40° F. throughout the test, was initially sealed with a modified atmosphere comprising about 18% oxygen, about 19% carbon monoxide, and the balance substantially all nitrogen. In 1 day, the oxygen concentration fell to about 10%; in 3, to about 1%. Carbon monoxide concentration fell to about 15% in 2 days, to about 10% in 5 days, to about 5% in 10 days, and to near zero in 20 days. Carbon dioxide concentration, initially near zero, rose above about 10% in 2 days, over about 15% in 3 days, over about 20% in 7 days, and over about 25% in 11 days.

In this example, carbon dioxide concentration rose more rapidly and attained generally higher levels for packaged cut lettuce stored at 40° F. than for the same lettuce stored at 35° F. Introducing carbon monoxide at concentrations above 5% by volume also increased the rate of increase in the carbon dioxide concentration. In this example, samples A and F had as good quality after storage as samples C and E. Samples A, C, E and F all were superior to samples B and D, which showed that initially elevated concentrations of carbon monoxide without elevated oxygen concentrations in the sealed packages was deleterious to chopped lettuce.

EXAMPLE II

In this example, six samples of commercially prepared shredded lettuce, having mean size of about one-quarter inch, were divided into two groups. The first group included samples A and B. Each was placed in a low density polyethylene bag measuring 12 by 24 inches and having wall thicknesses of about 3 mils. Such polyethylene bags have a permeability to carbon dioxide of 1350 cc per 100 square inches per 24 hours per mil, and a permeability to oxygen of 500 cc per 100 square inches per 24 hours per mil. Each of sample bags A and B was sealed without modifying the atmosphere within them.

The second group included samples C, D, E and F. Each of samples C, D, E and F was placed in a low density polyethylene bag measuring 12 by 24 inches and having wall thicknesses of about 1.5 mils. Such polyethylene bags have a permeability to carbon dioxide of 1350 cc per 100 square inches per 24 hours per mil, and a permeability to oxygen of 500 cc per 100 square inches per 24 hours per mil. The atmosphere within sample bags C, D, E and F were modified to the following initial compositions and then sealed:

C: About 26% oxygen, about 17% carbon monoxide, and the balance substantially all nitrogen:
D: About 11% oxygen, about 23% carbon monoxide, and the balance substantially all nitrogen;
E: About 18% oxygen, about 23% carbon monoxide, and the balance substantially all nitrogen;
F: About 8% oxygen, about 26% carbon monoxide, and the balance substantially all nitrogen.

Samples A, E and F were maintained at 40° F. throughout the test; samples B, C and D, at 35° F. throughout the test.

In the atmosphere surrounding samples A and B, the oxygen concentration dropped below 3% within 2 days and stayed close to that level throughout the test period. Carbon dioxide concentration rose to about 5% in 1 day, to about 10% in 2 days, to about 15% in 5 days, to about 20% in 10 days, and to about 25% in 16 days. After 14 days of storage at 35° F., samples A and B had deteriorated substantially.

In sample bag C, the oxygen concentration dropped to about 5% in 2 days, rose slightly through the 6th day, then dropped steadily to near zero percent by the 12th day. Carbon monoxide concentration dropped from below about 15% in 4 days, below about 10% in 9 days, below about 5% in 15 days, and to zero in 18 days. Carbon dioxide concentration rose to about 10% by the second day, and thereafter remained between about 10% and about 15% throughout the test period.

In sample bag D, oxygen concentration dropped below about 5% in 2 days, and to near zero by the 5th day, where it remained for the balance of the test. Carbon monoxide concentration dropped to about 20% in 1 day, to about 15% in 5 days, to about 10% in 15 days, to about 5% in 19 days, and then to near zero in 24 days.

In sample bag E, oxygen concentration dropped below about 15% in 3 days, below about 10% in 4 days, below about 5% in 7 days, and then to near zero in 8 days. Carbon monoxide concentration dropped below 20% by the third day, below 15% by the 4th day, below 10% by the 12th day, and below 5% by the 17th day, and then dropped to near zero by the 23rd day. Carbon dioxide concentration rose to more than 10% by the 6th day, to more than 15% by the 10th day, and thereafter rose less rapidly to about 19% by the 26th day.

In sample bag F, oxygen concentration dropped below about 5% in 1 day, and to near zero in 4 days, then rose again to near 5% by the 12th day before dropping again to near zero by the 20th day. The carbon dioxide concentration rose above 10% by the 4th day, to 15% by the 8th day, and then after dropping slightly through the 12th day, rose again to about 20% by the 18day. Meanwhile, the carbon monoxide concentration dropped steadily, falling below about 20% by the 4th day, below about 15% by the 7th day, below about 10% by the 9th day, and below about 5% by the 16th day.

Lettuce samples C and E treated according to this invention, remained fresh for 32 and 21 days, respectively. However, lettuce samples D and F exhibited breakdown after 19 and 14 days, respectively, showing that elevating carbon monoxide in the lettuce package had a detrimental impact if the oxygen concentration was not also elevated. Introducing a 5% or higher concentration of carbon monoxide alone before sealing appeared to accelerate the onset of anaerobic respiration in samples D and F, which was highly detrimental.

EXAMPLE III

In this example, head lettuce (variety Salinas) was chopped into pieces of about one-half inch and divided into 8 separate samples of equal weight lettered A through H. Samples A, C, E and G were each packed into low density polyethylene bags, measuring 12 by 24 inches and having wall thicknesses of about 1.5 mils. Such polyethylene bags have a permeability to carbon dioxide of 1350 cc per 100 square inches per 24 hours per mil, and a permeability to oxygen of 500 cc per 100 square inches per 24 hours per mil. Samples B, D, F and H were each packed into high density polyethylene plus Surlyn bags, measuring 12 by 24 inches and having wall thicknesses of 1.5 mils. Such polyethylene bags have a permeability to carbon dioxide of 1350 cc per 100 square inches per 24 hours per mil, and a permeability to oxygen of 500 cc per 100 square inches per 24 hours per mil.

In sample bags A and B, the atmospheres were modified to comprise initially about 43% and about 37% oxygen, respectively, about 14% and about 13% carbon monoxide, respectively, and the balance substantially all nitrogen. After sealing, sample bags A and B were stored for 14 days at 38° F. During the storage period, the oxygen concentration dropped from the initial levels to about 25% by the second day, in B, and by the first day in A, below about 20% by the third day in B, and by the second day in A, below about 15% by the fourth day in each, below about 10% after the 6th day in each, and then fell gradually to about 5% by the 10th day in each. Carbon dioxide concentration rose past about 10% on the 5th day in B, the sixth day in C, and then to a maximum of about 13%–14% on the 10th day in each, and did not exceed 15% at any time. Carbon monoxide concentration dropped below about 10% on the first day, below about 5% by the second day, below about 2% by the third day, and thereafter fell close to zero by the 6th day in both A and B. After 14 days of storage, lettuce from both A and B had good appearance, was free of discoloration, and had good taste.

In sample bags C and D, the atmospheres initially comprised about 38% and about 45% oxygen, respectively, and the balance was substantially all nitrogen. After 2 days of storage at 38° F., the concentrations of oxygen in both had dropped below 20%; after about 3 days, had dropped below about 15%. The oxygen concentration stabilized at about 10% and 7%, respectively, on about the 6th day of storage, and thereafter remained roughly constant in sample D, but rose to about 15% over the next 8 days in sample D. Carbon dioxide concentration rose in 2 days from near zero to about 5% in both, to about 10% in 6 days in both, and thereafter leveled off in D but declined in C to about 2% by the 14th day. After 14 days in storage, the lettuce in both samples C and D had good taste, but both had noticeable pink discoloration, which is commercially unattractive.

Each of sample bags E and F was initially sealed with a modified atmosphere comprising about 15% oxygen, about 11% carbon monoxide, and the balance substantially all nitrogen. By the second day, the oxygen concentration in each fell to about 6% and carbon monoxide concentrations in each fell to about 5%. Thereafter, the concentration of carbon monoxide in both samples dropped gradually to about 1% by the 10th day of storage. The oxygen concentration in each fell to about 4% and about 5%, respectively by the 6th day, then rose above 5% after the 9th day. Carbon dioxide concentration in each rose above about 5% by the second day, and above about 10% by the 5th day, thereafter leveling out and dropping off slightly to just below 10% by the 14th day of storage.

Although lettuce from samples E and F had good appearance after 14 days, both had strong off taste and odor, indicating that elevating the concentration of carbon monoxide without elevating the concentration of oxygen in the bag atmospheres before sealing produced objectionable results.

The atmospheres in sample bags G and H were not modified before sealing. After 2 days of storage, the oxygen concentration in each dipped below about 10%; after 6 days, below about 5% before climbing again to about 12% by the end of the 14-day period. Carbon dioxide concentration in each increased from near zero at the outset to over 5% by the 4th day, and over 10% by the 6th day, thereafter leveling off and dropping down to about 5% by the 14th day. At the end of the 14-day storage period, samples G and H had slight to severe discoloration, and intermediate off taste and aroma.

After 14 days, all eight sample packages were opened and placed in a room at 55° F. to simulate conditions at retail outlets. After 2 days, lettuce from all eight samples had pink discoloration; severe breakdown was evident in samples C, D, G and H. After 6 days at 55° F., lettuce in all samples exhibited some breakdown. In this example, samples A and B, treated initially with both elevated oxygen and carbon monoxide concentrations in accordance with this invention were superior.

EXAMPLE IV

In this example, 20 samples of equal weight of one-eighth lettuce shred were divided into 10 groups designated by the letters A through J, and four other samples of one-half inch lettuce chop with shredded purple cabbage and carrots added were divided into two groups designated K and L. Each of these twelve groups included two identical samples labeled 1 and 2, e.g., A1 and A2.

Samples A1, A2, B1 and B2 were placed in separate sealable bags made of low density polyethylene blended with 8% ethylene vinyl acetate, measuring 12" by 24" and having wall thicknesses of about 2 mils, and were stored at 38° F. Such bags have a permeability to carbon dioxide of 1350 cc per 100 square inches per 24 hours per mil, and a permeability to oxygen of 500 cc per 100 square inches per 24 hours per mil. These EVA-containing polyethylene bags are said to have somewhat greater strength and permeability than unmodified polyethylene bags of equal thickness.

Samples A1 and A2 were sealed in these bags with unmodified atmospheres. Within 2 days, the oxygen concentration in both fell to about 3%, and the carbon dioxide concentration rose to over 5%. By the 9th day, the oxygen concentration was below 5%, and the carbon dioxide concentration, near about 20%. Thereafter, the oxygen concentration in each rose slowly to about 5 and 8%, respectively, and the carbon dioxide concentration leveled off in the 15%-20% range.

In sample bags B1 and B2, the atmospheres were modified after sealing to comprise about 29% oxygen in each, about 3% and about 5% carbon monoxide, respectively, and the balance substantially all nitrogen. The oxygen concentration in each dropped to about 15% in 2 days, then below 5% in B1 and to about 6% in B2 in 3 days. The carbon dioxide concentration rose to about 15% in B1 and to about 10% in B2 in 3 days. Carbon monoxide concentration fell to near zero within 3 days. After the third day, the oxygen concentration in B2 stayed between about 2% and 4%, and the carbon dioxide concentration, between about 15% and 18%. In B1, which apparently leaked, oxygen concentration rose to a range of about 10% to about 12%, and carbon dioxide, to a range of about 17%–19%.

Samples C1, C2, D1 and D2 were each placed in packages made of the same low density polyethylene modified with 8% ethylene vinyl acetate, as were samples A1 and A2. However, these had wall thicknesses of about 2.5 mils, and a permeability to carbon dioxide of 1350 cc per 100 square inches per 24 hours per mil, and a permeability to oxygen of 500 cc per 100 square inches per 24 hours per mil.

The atmospheres within sample packages C1 and C2 were unmodified. The atmospheres within both of packages C1 and C2 comprised less than about 5% oxygen and more than about 5% carbon dioxide in 2 days. By the third day after sealing, the carbon dioxide concentration in both had risen to about 13%, and the oxygen concentration in both had stabilized at about 3%. By the 12th day, the carbon dioxide concentration in both had begun to rise again and rose to above 20% by the 18th day of storage; the oxygen concentration rose slowly from about 3% after the 15th day to about 5% in both by the 21st day.

The atmospheres in packages D1 and D2 were modified to comprise initially about 35% oxygen in both, about 8% and 6% carbon monoxide respectively, and the balance substantially all nitrogen. Within both of packages D1 and D2, the oxygen and carbon monoxide concentrations dropped below about 5% within 3 days. The oxygen concentration rose slowly from a low of about 4% on the 6th day to about 8% on the 20th day in D1, but did not rise above 5% in D2 at any time during the test. Carbon dioxide concentration rose above about 10% in 2 days, above about 15% in 3 days, to about 20% in 6 days and thereafter stayed near about 20% for the balance of the storage period. Carbon monoxide concentration dropped to zero in D2 in 6 days, and to zero in D1 in 3 days.

Samples E1, E2, F1 and F2 were each placed in sealable packages made of the same low density polyethylene modified with about 8% ethylene vinyl acetate as A1 and A2. Each package measured 12 by 24 inches and had wall thicknesses of about 3.0 mils. Such bags have a permeability to carbon dioxide of 1350 cc per 100 square inches per 24 hours per mil, and a permeability to oxygen of 500 cc per 100 square inches per 24 hours per mil.

The atmospheres in packages E1 and E2 were unmodified. Within two days after sealing the oxygen concentration dropped to about 3% in both, and thereafter did not rise above 5% in either for the balance of the storage period. The carbon dioxide concentration in both rose above about 15% in 3 days, above about 20% in 7 days, to about 30% in 13 days.

In sample bags F1 and F2, the oxygen concentration was raised initially to about 34% in both, and the carbon monoxide concentration, to about 8% and 3%, respectively. The balance of each atmosphere was substantially all nitrogen. In 3 days, the carbon monoxide concentration in both fell to near zero; the oxygen concentration, to about 4%. In both, carbon dioxide concentration rose above 15% in 3 days, and above about 25% in 12 days. The oxygen concentration in both equilibrated near about 3% for the balance of the storage period.

Sample packages G1, G2, H1 and H2 were each placed in packages made from low density polyethylene modified with about 3.5% ethylene vinyl acetate. Each package measured 12" by 24" and had wall thicknesses of about 3 mils. Such bags have a permeability to carbon dioxide of 1350 cc per 100 square inches per 24 hours per mil, and a permeability to oxygen of 500 cc per 100 square inches per 24 hours per mil.

The atmospheres in packages G1 and G2 were unmodified throughout the test. Within 2 days, the oxygen concentrations in G1 and G2 fell to (and thereafter remained at) about 3% and the carbon dioxide concentrations in each rose over 7%. Carbon dioxide concentrations then rose to over about 15% in 3 days, and over about 30% in 6 days.

The atmospheres in packages H1 and H2 initially comprised about 35% and 28% oyxgen, respectively, about 8% carbon monoxide in both, and the balance substantially all nitrogen. All were stored at 38° F. In both H1 and H2, the oxygen concentration dropped to about 2%, and the carbon monoxide concentration, to near zero in 3 days. Meanwhile, the carbon dioxide concentration rose to about 20% in 3 days, to about 30% in 9 days, and to about 35% in 13 days.

Samples I1, I2, J1 and J2 were placed in the same kind of packages as were G1, G2, H1 and H2. After sealing, the atmospheres in sample packages I1 and I2 were modified to comprise about 12% oxygen in both, and about 9% and about 11% carbon monoxide, respectively, with the balance substantially all nitrogen. By the end of the third day of storage, the oxygen concentration in both packages I1 and I2 had dropped to about 2%, the carbon monoxide concentrations, to about 7% and 5%, respectively. Carbon monoxide concentration dropped to zero in both in 9 days. The oxygen concentration remained between about 2% and 4% for the rest of the test period. Carbon dioxide concentration in packages I1 and I2 rose to about 10% in 3 days, above 15% in 7 days, above 20% in 9 days, and above 25% in 12 days.

After sealing sample packages J1 and J2, the atmospheres therein were modified to comprise about 30% and 25% oxygen respectively, about 8% and about 3% carbon monoxide, respectively, and the balance substantially all nitrogen. In 3 days, the oxygen concentration fell to about 3% and to about 5%, respectively, carbon monoxide concentration fell to near zero percent. Carbon dioxide concentration in both rose above about 10% in 3 days, above about 15% in 5days, and above about 20% in 7 days. In J1, carbon dioxide concentration rose above about 25% in 9 days. Each of packages I1, I2, J1 and J2 contained one ounce of lime, which absorbed some of the carbon dioxide formed in the package.

Samples K1, K2, L1 and L2, all 12 inch lettuce chop with shredded purple cabbage and carrots added, were each placed in packages made of low density polyethylene modified with 12% ethylene vinyl acetate. Each bag measured 12 by 24 inches and had wall thicknesses of about 2.5 mils. Such polyethylene bags have a permeability to carbon dioxide of 1350 cc per 100 square inches per 24 hours per mil, and a permeability to oxygen of 500 cc per 100 square inches per 24 hour per mil.

The atmospheres in samples K1 and K2 were modified to comprise about 35% oxygen, about 10% carbon monoxide, and the balance substantially all nitrogen. After 3 days of storage at 38° F., oxygen concentration dropped to about 15% in both, carbon monoxide concentration in both to about 5%. Carbon dioxide concentration rose to about 10% in both. After 6 days, carbon monoxide concentration in both K1 and K2 fell to near zero, and the oxygen concentration, to near 5%. Carbon dioxide concentration rose to about 15%. Thereafter, the oxygen concentration in both equilibrated at about 3%, the carbon dioxide, at about 16%.

The samples in packages L1 and L2 initially comprised about 33%–35% oxygen, about 10% carbon monoxide, and the balance substantially all nitrogen. In addition, sample packages L1 and L2 each included one ounce of lime to absorb carbon dioxide formed by the respiring lettuce. After 3 days at 38° F., the carbon monoxide concentration fell below 5% in both L1 and L2, and the oxygen concentration, to about 10% in both. Meanwhile, the carbon dioxide concentration rose to about 3%. After 6 days, carbon monoxide concentration in both packages was zero, oxygen concentration in both was below 5%, and the carbon dioxide concentration was below 5% in both. After 16 days, carbon dioxide concentration rose to about 13% in L1, and to about 8% in L2.

The rates of increase in and the maximum concentrations of carbon dioxide attained in lettuce chop packages K1, K2, L1 and L2 were all lower than those attained in lettuce shred packages A1, A2, B1, B2, C1, C2, D1, D2, E1, E2, F1, F2, G1, G2, H1, H2, I1, I2, J1 and J2 which suggested that lettuce shred respired faster than lettuce chop. Shred packages should be more permeable to oxygen and carbon dioxide than chop packages for the same lettuce variety and weight.

The following table details the number of days of storage at 38° F. before lettuce samples began to break down:

TABLE 1

| Sample | Package Material | Wall Thickness (Mils) | Days to Breakdown |
|---|---|---|---|
| A1 | Low Density PE/8% EVA*** | 2.0 | 20 |
| A2 | " | 2.0 | 20 |
| B1 | " | 2.0 | 24+ |
| B2 | " | 2.0 | 23 |
| C1 | " | 2.5 | 20 |
| C2 | " | 2.5 | 20 |
| D1 | " | 2.5 | 20 |
| D2 | " | 2.5 | 22 |
| E1 | " | 3.0 | 15 |
| E2 | " | 3.0 | 15 |
| F1 | " | 3.0 | 20 |
| F2 | " | 3.0 | 20 |
| G1 | Low Density PE/3.5% EVA** | 3.0 | 11 |
| G2 | " | 3.0 | 11 |
| H1 | " | 3.0 | 14 |
| H2 | " | 3.0 | 14 |
| I1 | " | 3.0 | 16 |
| I2 | " | 3.0 | 16 |
| J1 | " | 3.0 | 20 |
| J2 | " | 3.0 | 20 |
| K1 | Low Density PE/12% EVA* | 2.5 | 24+ |
| K2 | " | 2.5 | 24+ |
| L1 | " | 2.5 | 24+ |
| L2 | " | 2.5 | 24+ |

*Polyethylene modified with 12% ethylene vinyl acetate
**Polyethylene modified with 3.5% ethylene vinyl acetate
***Polyethylene modified with 8.0% ethylene vinyl acetate Packages A1, A2, B1 and B2 preserved lettuce shred better than C1, C2, D1 and D2, and C1, C2, D1 and D2 preserved lettuce shred better than E1, E2, F1 and F2, which showed that increasing sidewall thickness reduces oxygen and carbon dioxide permeability, thus reducing storage life. Moreover, initially elevating the oxygen and carbon monoxide concentrations above 21% and 5%, respectively, in the atmospheres within the packages consistently produced better results in these tests. Best results on lettuce shred were obtained with samples B1 and B2, where initial carbon monoxide and oxygen concentrations in the sample bags and the permeabilities of the packages, were within the ranges of the invention. Lettuce chop (samples K1, K2, L1 and L2) respired slower than the shred of the other samples, and lime held carbon dioxide concentrations low, thus producing good results with those samples.

EXAMPLE V

Head lettuce, variety Montemar, was chopped into one-half inch pieces, and divided into 5 groups with two members each, designated A1, A2 through E1 and E2. Lettuce samples A1, B1, C1, D1 and E1 each were packed in low density polyethylene bags measuring 12 by 24 inches and having wall thicknesses of 1.5 mils. Such polyethylene bags have a permeability to carbon dioxide of 1350 cc per 100 square inches per 24 hours per mil, and a permeability to oxygen of 500 cc per 100 square inches per 24 hours per mil. Samples A2, B2, C2, D2 and E2 were packed separately in high density polyethylene bags plus Surlyn, measuring 12" by 24" and having wall thicknesses of 1.5 mils. Such polyethylene bags have a permeability to carbon dioxide of 1350 cc per 100 square inches per 24 hours per mil, and a permeability to oxygen of 500 cc per 100 square inches per 24 hours per mil.

The atmosphere within sample packages A1 and A2 were unmodified. After sealing and storing these packages for 4 days at 38° F., the oxygen concentration fell to about 7%, and the carbon dioxide concentration rose to about 8%. After 6 days, the oxygen concentration in both fell to about 2% and the carbon dioxide concentration in both rose to about 10%. Thereafter, the carbon dioxide concentration dropped to about 7 or 8% and equilibrated. The oxygen concentration rose to and stayed at about 6% to the twelfth day, falling in A2 thereafter below about 5%.

The atmospheres in sample packages B1 and B2 were modified to comprise about 15% oxygen, about 7% carbon monoxide, and the balance substantially all nitrogen. After 3 days at 38° F., the oxygen concentration in each fell to about 8%, the carbon dioxide concentration rose to about 6% in each, and carbon monoxide concentration fell to about 1% and about 3%, respectively. After 6 days of storage, the oxygen concentration fell to about 4% in B2, and the carbon monoxide concentration, to about 3%. In B1, the oxygen concentration fell to about 7%, and the carbon monoxide concentration, to zero. Carbon dioxide concentration in B1 rose to about 8%, in B2, to about 10%. After 12 days, the B1 and B2 atmospheres comprised about 8% oxygen, about 9% carbon dioxide and the balance nitrogen.

The atmospheres in sample packages C1 and C2 were initially modified to comprise about 33% oxygen, with the balance substantially all nitrogen. After 3 days at 38° F., the oxygen concentrations in C1 and C2 fell to about 13% and about 15%, respectively, and the carbon dioxide concentrations rose to about 7% and 5%, respectively. Thereafter, the oxygen concentration in C1 equilibrated; the oxygen concentration in C2 dropped below 5% by the 8th day. Carbon dioxide concentration in both packages equilibrated by the 5th day at about 10% and about 4%, respectively, and remained near these concentrations throughout the test period.

The atmospheres in packages D1 and D2 were initially modified to comprise about 28% oxygen by volume, about 9% and 7% carbon monoxide, respectively, and the balance substantially all nitrogen. After 3 days at 38° F., the oxygen concentrations fell to about 13% and about 12%, respectively, the carbon monoxide concentrations to about 2% and 3%, respectively, and the carbon dioxide concentrations in each rose to about 8%. After 7 days, the carbon monoxide concentration fell to near zero in both, the carbon dioxide concentration rose above 10% in both, and the oxygen concentration fell to about 10%. Thereafter, the oxygen concentration dropped steadily, reaching a low of about 3% after the 11th day of storage in both. Carbon dioxide concentration equilibrated in both at about 14% by the 8th day.

The atmospheres in packages E1 and E2 were modified to comprise initially about 27% and 29% oxygen, respectively, about 8% carbon monoxide, and the balance substantially all nitrogen. Each also contained a one-ounce packet of lime to absorb carbon dioxide. After 3 days at 38° F., the carbon monoxide concentration in both fell to about 2%, the oxygen concentration fell to about 17%, and the carbon dioxide concentration was about 3%. After 6 days, the oxygen concentration fell to about 8%, the carbon dioxide concentration rose to about 7% and 5%, respectively, and the carbon monoxide concentration fell to about 1%. After 8 days of storage, the oxygen concentration in both packages equilibrated at about 5% and 4%, respectively, the carbon dioxide concentration equilibrated at about 8%, and the carbon monoxide concentration in each was close to zero.

After 2 weeks at 38° F., samples A2, B2, C2, D2 and E2 were opened and exposed to the atmosphere at 55° F. All these samples had good taste and aroma upon opening, and were free of breakdown. Sample C2, however, did show some discoloration. After 1 day at 55° F., all samples except B2 exhibited some discoloration. After 4 days at 55° F., all samples showed breakdown. B2 and D2 were in the best condition.

Samples A1, B1, C1, D1 and E1 were maintained in sealed condition for three weeks at 38° F. Upon opening, samples C1, D1 and E1 had good taste and aroma. C1 had severe discoloration; samples D1 and E1 had best color. Off taste and odor were strong in sample B1. After 2 days in the atmosphere at 55° F., all samples were in poor condition. Sample D1 was the best of these.

Overall, samples packaged with initially elevated oxygen and carbon monoxide concentrations, namely D1, D2, E1 and E2, showed the best storage and shelf life qualities.

EXAMPLE VI

Head lettuce, variety Salinas, was chopped into one-half inch pieces and divided into 10 groups labeled A1, A2, B1, B2, C1, C2, D1, D2, E1 and E2. Samples A1, B1, C1, D1 and E1 were packed in low density polyethylene bags, measuring 12 by 24 inches, and having wall thicknesses of 1.5 mils. Samples A2, B2, C2, D2 and E2 were packed in high density polyethylene plus Surlyn bags, measuring 12 by 24 inches and a wall thickness of 1.5 mils. Such polyethylene bags have a permeability to carbon dioxide of 1350 cc per 100 square inches per 24 hours per mil, and a permeability to oxygen of 500 cc per 100 square inches per 24 per mil.

The atmospheres in samples A1 and A2 were unmodified. After sealing and storing these sample packages for 3 days at 38° F., the oxygen concentration in A1 and A2 fell to about 8%, and the carbon dioxide concentration rose to about 8%. After 6 days of storage at 38° F., the oxygen concentration in both fell to about 5%, and the carbon dioxide concentration rose to about 10%.

After sealing samples B1 and B2, the atmospheres in each were modified to comprise about 34% and 32% oxygen, respectively, and the balance substantially all nitrogen. After 3 days at 38° F., the oxygen concentration in both fell to about 15%, and the carbon dioxide concentration rose to about 8%. After 6 days, the carbon dioxide concentration rose to about 12% in both, and the oxygen concentration in both fell to about 6%. After 9 days, both had an oxygen concentration of about 3%, and a carbon dioxide concentration of about 15%. Thereafter, the oxygen and carbon dioxide concentrations equilibrated.

After sealing sample packages C1 and C2, the oxygen concentration in each was reduced to about 17%, carbon monoxide was introduced at a concentration of about 8%, and the balance was substantially all nitrogen. After 3 days at 38° F., the carbon monoxide concentrations fell to about 5% and about 4%, respectively, the oxygen concentrations fell to about 8% in each, and the carbon dioxide concentration rose to about 8% in each. After 6 days, the oxygen concentration dropped to about 6% and 5%, respectively, the carbon monoxide, to about 3% in both, and the carbon dioxide rose to about 11% in both packages. After 9 days, the oxygen concentration fell to about 3% and 5%, respectively, carbon monoxide concentration fell to about 2% in each, and the carbon dioxide concentration rose to about 13% in each and equilibrated there for the balance of the test period.

After sealing packages D1 and D2, the oxygen concentration was elevated to about 32%, carbon monoxide was introduced at a concentration of about 9%, and the balance of the atmosphere in each was substantially all nitrogen. After 3 days at 38° F., the carbon monoxide concentrations fell to about 4% in both, the oxygen concentrations fell to about 16% and about 17%, respectively, and the carbon dioxide concentration rose to about 8% in both. After 6 days, the oxygen concentration in both packages fell to about 10%, the carbon dioxide concentration rose to about 10%, and the carbon monoxide concentration fell to about 2%. After 9 days, the carbon dioxide concentrations in both rose to about 14%, the oxygen concentration in both fell to about 4%, and the carbon monoxide concentration reached zero. Thereafter, the oxygen and carbon dioxide concentrations equilibrated at about 4% and 13%, respectively.

After sealing sample packages E1 and E2, the oxygen concentration was elevated in each to about 33%, carbon monoxide was introduced at a concentration of about 6%, and the balance of each atmosphere was substantially all nitrogen. After 3 days at 38° F., the oxygen concentration in both packages fell to about 16%, the carbon monoxide concentration fell to about 3% in both, and the carbon dioxide concentration rose to about 2% in package E1, but not at all in E2. After 6 days, the oxygen concentration fell to about 7% and about 9%, respectively, the carbon monoxide concentration fell to about 3% in both, and the carbon dioxide concentration had not risen above 2% in either. After 9 days, the oxygen concentration dropped to and equilibrated at about 4% in both, and the carbon monoxide concentration fell to about zero. The carbon dioxide concentration remained at or near zero throughout the test, primarily because packages E1 and E2 each contained a 2-ounce packet of lime to absorb carbon dioxide.

Sample packages A1, B1, C1, D1 and E1 were opened after 2 weeks of storage at 38° F. Appearance of the lettuce from all packages was good, but the lettuce from sample packages A1 and C1 had strong off odor and taste. Each of samples A1, B1, C1, D1 and E1 was thereafter stored at 50° F. in air. After 2 days in air, lettuce from sample E1 showed breakdown and pink discoloration. Lettuce from samples A1 and B1 had pink discoloration. After four days in air, lettuce from sample E1 was in poorest condition. Lettuce from samples A1 and B1 had poorest color. Lettuce from samples D1 and E1 had best taste and lettuce from sample D1 had the best appearance.

Lettuce samples A2, B2, C2, D2 and E2 were opened after 3 weeks storage at 38° F. Lettuce from sample C2 had the poorest taste and odor. Lettuce from samples A2 and E2 had best taste. Lettuce from B2 and D2 had acceptable taste. All of samples A2 through E2 were thereafter exposed to air at 50° F. for 5 days. After 2 days, samples A2 and E2 exhibited moderate pink discoloration; breakdown was severe in samples A2 and C2. After 5 days, all lettuce samples and objectionable color, but samples B2 and D2 exhibited no breakdown whatsoever.

Overall, best storage life and shelf life resulted with samples D1 and D2 where the lettuce was initially packaged with a modified atmosphere comprising an oxygen concentration greater than about 30%, and a carbon monoxide concentration greater than about 5%.

EXAMPLE VII

Head lettuce, variety Montemar, was chopped into one-half inch size pieces, and divided into 10 groups, designated A1 A2, B1, B2, C1, C2, D1, D2, E1, and D2. Samples A1, B1, C1, D1, and E1 were packed into low density polyethylene bags measuring 12 by 24 inches and having wall thicknesses of about 1.5 mils. Such bags have a permeability to carbon dioxide of 1350 cc per 100 square inches per 24 hours per mil, and a permeability to oxygen of 500 cc per 100 square inches per 24 hours per mil. Samples A2, B2, C2, D2 and E2 were packed into high density polyethylene plus Surlyn bags measuring 12 by 24 inches and having wall thicknesses of about 1.5 mils. Such bags have a permeability to carbon dioxide of 1350 cc per 100 square inches per 24 hours per mil, and a permeability to oxygen of 500 cc per 100 square inches per 24 hours per mil.

Sample packages A1 and A2 were sealed without modifying the atmosphere in them. After three days at 38° F., the oxygen concentration in each dropped to about 8%, and the carbon dioxide concentrations rose to about 6% and 9%, respectively. After 6 days at 38° F., the carbon dioxide concentrations rose to 10% and 13%, respectively, and the oxygen concentration fell to about 4% in each. After 9 days, the oxygen concentration fell to about 2%, and the carbon dioxide concentration rose to about 13% and 15%, respectively. After 12 days, the oxygen concentration equilibrated at about 1%, and the carbon dioxide concentrations equilibrated at about 13% and 18%, respectively.

After sealing samples B1 and B2, the atmospheres in each package were modified to comprise about 35% and 33% oxygen, with the balance substantially all nitrogen. After 3 days at 38° F., the oxygen concentrations in B1 and B2 fell to about 15%, and the carbon dioxide concentration in each rose to about 10%. After 6 days at 38° F., the oxygen concentration in each fell to about 3%, and the carbon dioxide concentrations rose to about 12% and 15%, respectively. After 9 days at 38° F., the oxygen concentrations in samples B1 and B2 dropped to about 2%, and the carbon dioxide concentrations rose to and equilibrated at about 13% and 17%, respectively.

After sealing the packages containing lettuce samples C1 and C2, the atmospheres in each were modified to comprise about 16% oxygen, about 7% carbon monoxide, and the balance substantially all nitrogen. After 3 days at 38° F., the atmospheres in C1 and C2 comprised about 5% oxygen and 5% carbon monoxide, and about 8% carbon dioxide. After 6 days at 38° F., the oxygen and carbon monoxide concentrations in each fell to about 4%, and the carbon dioxide concentration rose to about 13%. After 9 days at 38° F., the oxygen and carbon monoxide concentrations equilibrated at about 3%, and the carbon dioxide concentration equilibrated at about 18% in both. Thereafter, the carbon monoxide concentration in sample package C2 dropped to near zero by the 15th day, as did the oxygen concentration in both sample packages. The carbon monoxide concentration in sample package C1 equilibrated at about 3% through the 15th day of storage.

After sealing the packages containing lettuce samples D1 and D2, the atmospheres in each was modified to comprise about 27% and 36% oxygen, respectively, 3% and 5% carbon monoxide, respectively, and the balance substantially all nitrogen. After 3 days at 38° F., the atmospheres in D1 and D2 comprised about 3% carbon monxide, about 10% carbon dioxide, and about 10% and and about 23% oxygen, respectively. After 6 days, the carbon dioxide concentrations in each rose to about 13%, the oxygen concentration dropped to about 5% and 14%, respectively, and the carbon monoxide concentration dropped to about 2% in each. After 9 days, the carbon monoxide concentration was near zero in both, the oxygen concentration was about 2%, and the carbon dioxide concentration about 15%. From the 9th through the 21st day of storage, the oxygen and carbon monoxide concentrations dropped gradually towards zero; the carbon dioxide concentration continued to rise above 15%.

After sealing packages containing samples B1 and B2 the atmospheres in each were modified to comprise about 32% and 34% oxygen, respectively, about 5% carbon monoxide, and the balance substantially all nitrogen. After 3 days at 38° F., the oxygen concentration in each package has dropped to about 15%, and the carbon monoxide concentration, to about 2%. After 6 days, the oxygen concentration had dropped to about 7% in each, the carbon monoxide concentration had dropped to about 1% in each, and the carbon dioxide concentration had risen to about 3% and 4%, respectively. After 9 days of storage at 38° F., the carbon monoxide concentration fell to near zero, the oxygen concentration, to about 2% but the carbon dioxide concentration had risen to only about 3% in E1 and to only about 6% in E2. Thereafter, the oxygen and carbon monoxide concentrations dropped closer to zero, and the carbon dioxide concentrations continued to rise, but did not exceed 7% in E1 or 10% in E2. A two-ounce packet of lime in each bag absorbed much of the carbon dioxide formed from respiration.

After two weeks storage at 38° F., sample packages A1, B1, C1, D1 and E1 were opened and stored in the atmosphere at 50° F., for 5 days. Upon first opening these packages, lettuce from samples A1, B1 and D1 had good appearance and taste. Lettuce from samples C1 and E1 had strong off odor and taste. No breakdown or discoloration was evident in any of the samples. After 3 days storage at 50° F., all lettuce had slight discoloration, but no breakdown. After 5 days at 50° F., only lettuce from sample E1 had breakdown and moderate pink discoloration. Lettuce samples B1 and D1 had the best taste and appearance.

Lettuce samples A2, B2, C2, D2 and E2 were opened after 3 weeks of storage at 38° F., and all lettuce had good appearance. Lettuce from samples E2 and B2 had best taste, lettuce from sample D2 had a slight off taste, and lettuce from sample C2 had strong off taste.

All lettuce samples A2 through E2 were stored in open air at 50° F. for 6 days. After 3 days at 50° F., only sample E2 had discoloration. After 4 days, lettuce from samples B2 showed some discoloration, and lettuce from sample A2 had some breakdown. After 6 days, lettuce from samples D2 and C2 had no breakdown and no discoloration. Lettuce from all other samples, namely A2, B2 and E2, had severe breakdown and discoloration.

Overall, chopped lettuce packaged with modified atmospheres initially comprising an oxygen concentration greater than about 25% and a carbon monoxide concentration greater than about 5% with the balance substantially all nitrogen, namely, samples D1 and D2, produced the best taste, appearance, storage life and shelf life.

EXAMPLE VIII

Lettuce from commercially prepared shred measuring one eighth inch was divided into eight groups designated A1, A2, B1, B2, C1, C2, D1 and D2. Samples A1, B1 and C1 were each repacked in separate sealable low density polyethylene bags, measuring 12 by 24 inches and having wall thicknesses of 1.5 mils. Such bags have a permeability to carbon dioxide of 1350 cc per 100 square inches per 24 hours per mil, and a permeability to oxygen of 500 cc per 100 square inches per 24 hours per mil.

Samples A2, B2, C2, D1 and D2 were each packed into sealable bags measuring 12 by 24 inches made from low density polyethylene modified with 4.5 percent ethylene vinyl acetate. These bags had sidewall thicknesses of about 3.0 mils. Such bags have a permeability to carbon dioxide of 1350 cc per 100 square inches per 24 hours per mil, and a permeability to oxygen of 500 cc per 100 square inches per 24 hours per mil.

After sealing sample package A1, the atmosphere therein was modified to comprise about 35% oxygen, about 12% carbon monoxide, and the balance substantially all nitrogen. The atmosphere in sample package A2 was unmodified. After sealing, both bags were stored at 38° F. After 3 days, the oxygen concentration in A1 fell to about 6%, the carbon monoxide concentration fell to zero, and the carbon dioxide concentration rose to about 17%. In A2, after 3 days, the oxygen concentration fell to about 2%, and the carbon dioxide concentration rose to about 20%. After 6 days, the oxygen concentration in A1 equilibrated at about 7%, and the carbon dioxide concentration reached about 20%. In A2, the oxygen concentration eqilibrated at about 3%, and the carbon dioxide concentration rose to about 28%.

After sealing package B1, the atmosphere therein was modified to comprise initially about 35% oxygen, about 7% carbon monoxide, and the balance substantially all nitrogen. The atmosphere in B2 was not modified. After 3 days at 38° F., B1 had an oxygen concentration of about 3%, a carbon monoxide concentration of zero, and a carbon dioxide concentration of about 15%. After 6 days at 38° F., B1 had an oxygen concentration of about 7%, a carbon dioxide concentration close to 20%, and a carbon monoxide concentration of zero. After 9 days at 38° F., B1 had an oxygen concentration of about 6%, a carbon dioxide concentration of about 23%, and a carbon monoxide concentration of zero.

After 3 days at 38° F., B2 had an atmosphere comprising about 2% oxygen by volume, and about 18% carbon dioxide by volume. After 6 days, the carbon dioxide concentration rose to about 22%, and the oxygen concentration had equilibrated around 4%. After 9 days at 38° F., the atmosphere in B2 had an oxygen concentration of about 4% and a carbon dioxide concentration of about 26%.

After sealing the package containing sample C1, the oxygen concentration therein was modified to about 30%, carbon monoxide was introduced at a concentration of near 10%, and the balance was substantially all nitrogen. Package C2 had an unmodified atmosphere. After 3 days at 38° F., the atmosphere in C1 had an oxygen concentration of about 5%, a carbon monoxide concentration of zero, and a carbon dioxide concentration of about 19%. After 6 days, C1 had an oxygen concentration of about 3%, and a carbon dioxide concentration of about 25%. After 9 days, the carbon dioxide concentration was about 27%, and the oxygen concentration had equilibrated at about 3%.

In package C2, the oxygen concentration dropped to about 2% after 1 day, and equilibrated at about 3% thereafter. Meanwhile, the carbon dioxide concentration in C2 rose to about 18% in 3 days, to about 25% in 6 days, and to about 27% in 9 days.

After sealing package D1, the atmosphere therein was modified to comprise about 36% oxygen, about 7% carbon monoxide, and the balance substantially all nitrogen. Packaged D2 had an unmodified atmosphere. After 3 days at 38° F., the oxygen concentration in D1 dropped to about 8% and the carbon monoxide concentration, to about zero. The carbon dioxide concentration rose to about 18%. After 6 days, the atmosphere in D1 had an oxygen concentration of about 7%, a carbon dioxide concentration of about 23%, and a carbon monoxide concentration of zero. After 9 days, the atmosphere in D1 had about 5% oxygen, and about 27% carbon dioxide.

Meanwhile, in the atmosphere in package D2, the oxygen concentration dropped to 2% after 1 day, and thereafter equilibrated between 2% and 4% throughout the test period. The carbon dioxide concentration rose about 20% in 3 days, to about 23% in 6 days, and over 27% in 9 days.

After 14 days at 38° F., the sample packages A1, A2, B1 and B2 were opened, and breakdown was evident in the lettuce from packages B1 and B2. Lettuce from sample packages A1 and A2 had good appearance and no breakdown. The taste and aroma of the lettuce was somewhat off in all of samples A1, A2, B1 and B2, but was more severe in A2 and B2 than in A1 and B1.

Packages C1 and C2 were opened after 18 days of storage, and product breakdown was evident in both bags. Lettuce shred from both C1 and C2 had strong off odor and taste. The same was true of the lettuce in packages D2 and D1 after 14 days, apparently because both bags were thicker than 2 mils.

The results in this example would not justify increasing the oxygen and carbon monoxide concentrations initially before sealing the packages. Carbon dioxide concentrations reached and maintained levels that were too high in both bag types. The results in other Examples show that increasing the initial concentration of oxygen and carbon monoxide in sealed packages will not produce satisfactory outturn unless the packages are sufficiently permeable to oxygen and carbon dioxide to keep the carbon dioxide concentration within such packages at or below about 20%. With the polyethylene bags and the one-eighth inch shredded lettuce used in this run, carbon dioxide concentrations were too high and oxygen concentration too low for good results. A more permeable package is necessary under these conditions.

EXAMPLE IX

Four bunches of cut broccoli were placed into sealable bags made of low density polyethylene modified with 4.5 percent ethylene vinyl acetate. The walls of these bags were about 1.5 mils in thickness. These four samples of cut broccoli were labeled A, B, C and D, respectively. The atmosphere within the bag holding Sample A was initially modified to contain about 29 percent oxygen, about 5 percent carbon monoxide, and the balance was substantially all molecular nitrogen. The atmosphere within the bag holding Sample A was unmodified. The atmosphere in the bag holding Sample C was initially modified to contain about 14 percent oxygen, about 19 percent carbon monoxide and the balance was substantially all molecular nitrogen. In addition, 2 ounces of lime was also placed within the bag containing Sample C. The atmosphere within the bag containing Sample D was unmodified, but the 2 ounces of lime was placed within that bag before sealing.

After sealing the bags containing Samples A, B, C and D, each was maintained at a temperature of 38° F. for three weeks. During that time, the oxygen concentration surrounding Sample A declined from 29 percent to 15 percent by the third day, to about 1 or 2 percent by the sixth day and remained at that level through the balance of the test. Meanwhile, the carbon dioxide concentration rose from near zero at the outset to about 13 percent by the sixth day and thereafter began to decline, concluding at about 8 percent by the end of the third week. The carbon monoxide concentration in the bag containing Sample A dropped from its initial 21 percent by volume to approximately 2 percent within two days, and remained near 2 percent for the rest of the test.

The atmosphere within the package containing Sample B showed a decline in oxygen concentration from 21 percent at the outset to about 2 percent by the second day, where it remained for the balance of the test. The carbon dioxide concentration surrounding Sample B rose to 8 percent by the second day, and remained at or near 8 percent for the balance of the test.

In Sample bag C, the carbon monoxide concentration declined to 10 percent by the third day, to about 3 percent by the sixth day, and remained near 3 percent for the rest of the test period. The oxygen concentration fell to about 1 percent within two days, and remained near 1 percent for the rest of the test period. In Sample bag D, the oxygen concentration fell to about 2 percent within two days and remained near 2 percent for the balance of the test period.

After 3 weeks of storage at 38° F., the bags were opened, and the appearance of the broccoli with them was determined visually. The results obtained were as follows:

| Sample | Appearance | Odor | Decay | Discoloration | Total |
| --- | --- | --- | --- | --- | --- |
| A | 1 | 2 | 1 | 1 | 5 |
| B | 3 | 1 | 2 | 3 | 9 |
| C | 2 | 4 | 2 | 2 | 10 |

-continued

| Sample | Appearance | Odor | Decay | Discoloration | Total |
|---|---|---|---|---|---|
| D | 5 | 1 | 4 | 4 | 14 |

Appearance:
1-Excellent
2-Good
3-Fair
4-Poor
5-Very poor
Others:
1-None
2-Trace
3-Slight
4-Medium
5-Severe Clearly, the best results were obtained with Sample A, which had little or no discoloration and generally excellent appearance. None of the other treatments was satisfactory.

EXAMPLE X

Ten pounds of shredded red cabbage were placed in a low density polyethylene bag made from sheet material having a thickness of about 1.5 mils. The bag was sealed, and the atmosphere inside the bag was modified to contain about 23% oxygen, about 3% carbon monoxide, and about 74% nitrogen. The bag was then stored at 38° F. for 19 days. During the 19-day period, the gaseous atmosphere within the bag was analyzed several times. After two days of storage, the oxygen concentration fell to about 5%, then rose gradually to about 15% by the end of the test period. The carbon monoxide concentration fell to about 2% in two days, and to zero in four days where it remained for the balance of the test period. The carbon dioxide concentration rose from near zero at the outset to about 10% in six days, and then equilibrated at about 5% for the balance of the period.

The cabbage had excellent appearance in the bag after 14 days of storage. At the end of the test period, the cabbage had good odor and taste, but slight discoloration of the cut surfaces was evident. A higher initial carbon monoxide concentration would probably prevent this discoloration.

EXAMPLE XI

Four samples (denoted A, B, C & D) of cut cauliflower, each weighing about 2.5 lbs. were placed on foamed plastic trays measuring 9×11×0.625 inches, and each was sealed in a low density polyethylene bag made from sheet material having a thickness of about 1.5 mils.

Four additional samples (denoted E, F, G & H) of such cauliflower, each weighing about 2.5 lbs., were placed in trays of the same kind and dimensions, and each was sealed in a low density polyethylene bag made from sheet material having a thickness of about 2.0 mils.

Four other samples (denoted I, J, K & L) of cut cauliflower, each weighing about 0.75 lb. were placed on foamed plastic trays measuring 4.5×8.5×0.625 inches, and each was sealed in a polyvinyl chloride bag made from sheet material having a thickness of about 0.5 mil.

After sealing samples I and J, the atmospheres inside these bags were modified to contain concentrations of about 50% and about 45% oxygen, respectively, of about 5% and 4% carbon monoxide, respectively, with the balance in each substantially all nitrogen. Samples K and L were also sealed, but the atmospheres in these bags were unmodified air.

All four sample bags were stored at 38° F. Samples I and K were opened after 14 days of storage; samples J and L, after 21 days of storage. Throughout these storage periods, the gaseous atmosphere within each bag was analyzed several times.

In sample I, the oxygen concentration fell to about 15% in two days, and to about 3% in six days, where it remained for the balance of the period. The carbon monoxide concentration fell gradually to about 1% over the storage period. The carbon dioxide concentration rose from near zero at the outset to about 2% within two days, and remained at or about that level for the balance of the test period.

In sample K, the oxygen concentration fell to about 10% in three days, and equilibrated at that level for the balance of the test period. The carbon dioxide concentration rose from near zero at the outset to about one percent, and remained at about that level for the balance of the test period.

In sample J, the oxygen concentration fell to about 20% in two days, to about 10% in six days, and remained at or about that level for the balance of the test period. The carbon monoxide concentration fell to about 1% in three days and to near zero in six days, where it remained for the balance of the test period. The carbon dioxide concentration rose from near zero at the outset to about 1%, and remained at that level throughout the test period.

In sample L, the oxygen concentration fell to about 10% in two days, to about 5% in three days, and remained at or about 3% for the balance of the test period. The carbon dioxide concentration in this sample rose from near zero at the outset to about 2%, and remained at or about that level for the balance of the test period.

After the 14-day storage period for samples I and K, the packages containing these samples were opened, and the product observed. The cauliflower from the unmodified atmosphere was slightly discolored; carbon monoxide-treated cauliflower (I) had a fresh appearance. No sample had any evidence of floret mold or decay, and taste and odor of the cauliflower were good in all treatments.

After three days of storage of this cauliflower at 45° F., untreated cauliflower was severely discolored; carbon monoxide-treated cauliflower was only slightly discolored. Again, neither floret mold nor decay was evident in any of the cauliflower.

After sealing samples A and C, the atmospheres inside these bags were modified to contain concentrations of about 48% and about 43% oxygen, respectively, and about 5% carbon monoxide each; the balance in each was substantially all nitrogen. Samples B and D were also sealed, but the atmospheres in these bags was not modified. Besides the modified atmospheres, samples A and B also contained lime, which absorbs carbon dioxide.

All four sample bags were stored at 38° F. for 21 days. Throughout these periods, the gaseous atmosphere in each of the bags was analyzed several times.

In sample A, the oxygen concentration fell to about 30% in three days, and to about 3% in six days where it remained for the balance of the test period. The carbon monoxide concentration fell gradually to about 3% over the test period. In sample B, the oxygen concentration fell to about 3% in three days, to about 1% in six days, and remained at or about that level for the balance of the test period.

In sample C, the oxygen concentration fell to about 20% in three days, to about 10% in six days, to about 3% in nine days, and remained at or about that level for the balance of the test period. The carbon monoxide concentration fell gradually from about 5% to about 2% by the end of the test period. The carbon dioxide concentration rose from near zero at the outset to a high of about 10% in seven days, and thereafter gradually declined to a level of about 7 or 8% over the balance of the test period.

In sample D, the oxygen concentration fell to about 10% in three days, and remained at or about that level for the balance of the test period. The carbon dioxide concentration rose to about 5% in six days, and thereafter declined to about 2% by the end of the test period.

At the end of the three-week storage period, the cauliflower from sample A had the best appearance. Its surfaces were free from discoloration, floret decay and mold were inhibited, and no off odor could be detected. Cauliflower from sample B had severe decay and discoloration. Cauliflower from sample C had good appearance, but had strong off odor. Cauliflower from sample D was severely discolored, and showed evidence of floret mold and decay. The cauliflower from sample A retained good appearance after five days of storage at 45° F. following the three-week storage period at 38° F.

After sealing samples E and G, the atmospheres inside these bags were modified to contain concentrations of about 51% oxygen in each, about 5% carbon monoxide in each, with the balance in each substantially all nitrogen. Samples and F and H were also sealed, but the atmosphere in these bags was not modified. All four sample bags were stored for 14 days at 38° F. Throughout these periods, the gaseous atmosphere in each was analyzed several times.

In sample E, the oxygen concentration fell to about 30% in one day, to about 20% in three days, to about 10% in five days, and thereafter declined gradually to near 3% at the end of the test period. Carbon monoxide concentration declined from 5% to about 1% in six days, and remained at or about that level for the balance of the test period. In sample F, the oxygen concentration fell to 5% within two days, and thereafter declined gradually to about 2% by the end of the test period.

In sample G, the oxygen concentration declined to 40% in three days, to about 20% in five days, to about 10% in eight days, to about 5% in nine days, and thereafter declined to about 1% by the end of the test period. Carbon monoxide concentration remained at or about 5% throughout the test period. The carbon dioxide concentration rose from about zero at the outset to a maximum of 10% in seven days, and thereafter declined to about 5% by the end of the test period.

In sample H, the oxygen concentration dropped to 10% in one day, to about 5% in three days, to about 2% in six days, and thereafter rose to about 4% by the end of the test period. The carbon dioxide concentration in sample H rose from near zero at the outset to about 5%, and remained at or about that level for the balance of of the test period.

Upon opening samples E, F, G and H, at the end of the test period, sample E, which contained lime in the package throughout the test period, had best appearance. Taste and odor of the cauliflower from sample E were good, and neither floret mold or decay was in evidence. Sample F, which also contained lime throughout the test period, had off odor and slight discoloration at the cut surfaces. Sample G had good appearance, but off odor, attributable in part to lack of lime in the sample. Sample H had acceptable odor, but had some discoloration of the cut surfaces.

AFter holding samples E, F, G and H at 45° F. for three days following the end of the two-week test period, only sample E was in good condition.

EXAMPLE XII

Six celery samples, each containing some three-inch pieces of cut celery, and some longitudinally cut celery sticks, each sample weighing about 10 lbs., were placed into bags made of polyethylene containing about 4.5% ethylene vinyl acetate made from sheet material having a thickness of about 1.5 mils. Two additional celery samples of about the same weight and composition were placed into bags made of a polyethylene with 8% ethylene vinyl acetate added. These bags were made from a sheet material having a thickness of about 2.0 mils.

After sealing each of the bags containing the celery samples (denoted A, B, C, D, E, F, G & H), sample packages A, B, C and D were placed in storage at 38° F., without any modification of the atmospheres within those bags.

Samples E and F were placed in storage at 38° F., after modifying the atmospheres in these bags to contain concentrations of about 40% and about 36% oxygen, respectively, about 12% carbon monoxide in each, with the balance in each substantially all nitrogen.

After sealing samples G and H, the atmospheres in these bags were modified to contain concentrations of about 15% oxygen, about 12% and about 16% carbon monoxide, respectively, with the balance in each substantially all molecular nitrogen. These samples were also stored at 38° F.

Samples B and D were maintained in storage at 38° F., for about 14 days. Over that time span, the oxygen concentration in sample B fell to about 10% in three days, to about 5% in six days, and stayed at or near the 6% level to the end of the period. The carbon dioxide concentration in sample B rose from near zero at the outset to about 5% in 6 days, and remained at or about that level for the balance of the test period. In sample D, the oxygen concentration fell to about 15% in one day, and thereafter remained at or about 15% for the balance of the test period. The carbon dioxide concentration rose to and remained at about 2% throughout the test period.

Samples A and C were maintained in storage at 38° F., for 21 days before opening. In sample A, the oxygen concentration fell to about 10% in three days, to about 5% in six days, and remained at or near that level for the balance of the test span. The carbon dioxide concentration in sample A rose from near zero at the outset to about 5% in 6 days, and remained at that level for the balance of the 21-day test period. In sample C, the oxygen concentration fell to 10% in about three days, to about 5% in six days, and then declined gradually to about 4% over the balance of the test period. The carbon dioxide concentration, near zero at the outset, rose to about 5% in 15 days, and thereafter remained near that level for the balance of the test period.

After 14 days of storage at 38° F., the celery from samples B and D had good taste, but the cut ends exhibited some slight discoloration. Celery from samples A and C had poor appearance because of discoloration at the cut ends, but had good taste.

After three days of storage at ambient temperatures, discoloration appeared and became more severe on samples B and D; discoloration was evident on samples A and C at the end of the test period.

In sample package E, the oxygen concentration declined to about 28% in three days, to about 20% in eight days, to about 10% in 15 days, and to about 5% by the end of the three week test period. Carbon monoxide concentration in sample E declined from about 12% to about 5% in 14 days, and from there to about 4% by the end of the three-week test period. Carbon dioxide concentration, near zero at the outset, advanced to about 5% within six days, and remained at or about that level for the balance of the period.

In sample G, the oxygen concentration declined to about 10% in two days, to about 5% in five days, and then gradually to about 3% where it remained for the balance of the test period. The carbon monoxide concentration in sample G dropped from 12% to about 10% in seven days, and thereafter gradually fell to about 6% by the end of the three-week test period. The carbon dioxide concentration in sample G, near zero at the outset, rose to about 3%, and remained at that level throughout the three-week period.

At the end of three weeks, sample packages E and G were opened, and their appearance observed. Celery from sample E had excellent appearance and no off taste. Celery from sample G had excellent appearance, but had a slight off taste. After two days at ambient temperatures, celery from sample E retained good appearance, but did show some slight discoloration after three days. The slight off taste in the celery of sample G persisted at the end of both two days and three days.

In sample package F, the oxygen concentration declined from about 36% at the outset to about 20% in five days, to about 10% in nine days, and thereafter gradually fell to near 3% by the end of the two-week storage period. Carbon monoxide concentration declined from about 12% at the outset to about 10% in six days, and remained at or about that level to the end of the two-week test period. Carbon dioxide concentration, near zero at the outset, rose to and remained at or about 5% throughout the test period.

In sample package H, the oxygen concentration declined to about 10% in two days, to about 5% in four days, and to about 2% in eight days, where it remained for the balance of the test period. The carbon monoxide concentration declined gradually to about 12% by the end of the test period. The carbon dioxide concentration, near zero at the outset, rose to and remained at or about 5% throughout the test period.

Upon opening sample packages F and H at the end of two weeks in storage, celery from sample package F had excellent appearance and no discoloration of cut surfaces. Celery from sample F had good appearance, but slight off taste and odor. After three days of storage at ambient temperatures, celery from sample F retained good appearance. Slight off flavor persisted in celery from sample H, but this celery otherwise had good appearance.

What is claimed is:

1. Process comprising placing at least one vegetable into a sealable package having permeabilities to oxygen, carbon monoxide and carbon dioxide at least as high as low density polyethylene having a thickness not greater than about 2 mils, and then sealing within said package a modified atmosphere comprising at least about 25% oxygen by volume, at least about 3% carbon monoxide by volume, and the balance substantially all molecular nitrogen.

2. The process of claim 1 wherein said atmosphere comprises at least about 40% oxygen by volume.

3. The process of claim 2 wherein said vegetable is lettuce.

4. The process of claim 3 wherein said package is made of flexible sheet material.

5. The process of claim 1 wherein the vegetable is lettuce.

6. The process of claim 1 wherein said package and its contents are maintained at a temperature below about 45° F. but above the freezing point of the moisture in said at least one vegetable.

7. The process of claim 6 wherein the temperature of said package and contents is maintained below about 35° F.

8. The process of claim 1 wherein said at least one vegetable is selected from the group consisting of lettuce, celery, green onions, broccoli, cauliflower, parsley and cabbage.

9. Process comprising placing at least one cut vegetable into a sealable package having permeabilities to oxygen, carbon monoxide and carbon dioxide at least as high as low density polyethylene having a thickness not greater than about 2 mils, and then sealing within said package a modified atmosphere comprising at least about 25% oxygen by volume, at least about 3% carbon monoxide by volume, and the balance substantially all molecular nitrogen.

10. The process of claim 9 wherein said atmosphere comprises at least about 40% oxygen by volume.

11. The process of claim 10 wherein said vegetable is lettuce.

12. The process of claim 11 wherein said package is made of flexible sheet material.

13. The process of claim 9 wherein the cut vegetable is lettuce.

14. The process of claim 9 wherein said package and its contents are maintained at a temperature below about 45° F. but above the freezing point of the moisture in said at least one cut vegetable.

15. The process of claim 14 wherein the temperature of said package and contents is maintained below about 35° F.

16. The process of claim 9 wherein said at least one cut vegetable is selected from the group consisting of lettuce, celery, green onions, broccoli, cauliflower, parsley and cabbage.

17. Process comprising placing at least one vegetable into a sealable package having a permeability to oxygen of at least about 500 cc per 100 square inches of package surface per 24 hours per mil of package thickness, and having permeabilities to each of carbon monoxide and carbon dioxide of at least about 1,350 cc per 100 square inches of package surface per 24 hours per mill of package thickness, and then sealing within said package a modified atmosphere comprising at least about 25% oxygen by volume, at least about 3% carbon monoxide by volume, and the balance substantially all molecular nitrogen.

18. The process of claim 17 wherein said atmosphere comprises at least about 40% oxygen by volume.

19. The process of claim 18 wherein said vegetable is lettuce.

20. The process of claim 19 wherein said package is made of flexible sheet material.

21. The process of claim 17 wherein the vegetable is lettuce.

22. The process of claim 17 wherein said package and its contents are maintained at a temperature below about 45° F. but above the freezing point of the moisture in said at least one vegetable.

23. The process of claim 22 wherein the temperature of said package and contents is maintained below about 35° F.

24. The process of claim 17 wherein said at least one vegetable is selected from the group consisting of lettuce, celery, green onions, broccoli, cauliflower, parsley and cabbage.

25. Process comprising placing at least one cut vegetable into a sealable package having a permeability to oxygen of at least about 500 cc per 100 square inches of package surface per 24 hours per mil of package thickness, and having permeabilities to each of carbon monoxide and carbon dioxide of at least about 1,350 cc per 100 square inches of package surface per 24 hours per mil of package thickness, and then sealing within said package a modified atmosphere comprising at least about 25% oxygen by volume, at least about 3% carbon monoxide by volume, and the balance substantially all molecular nitrogen.

26. The process of claim 25 wherein said atmosphere comprises at least about 40% oxygen by volume.

27. The process of claim 26 wherein said vegetable is lettuce.

28. The process of claim 27 wherein said package is made of flexible sheet material.

29. The process of claim 25 wherein the cut vegetable is lettuce.

30. The process of claim 25 wherein said package and its contents are maintained at a temperature below about 45° F. but above the freezing point of the moisture in said at least one cut vegetable.

31. The process of claim 30 wherein the temperature of said package and contents is maintained below about 35° F.

32. The process of claim 25 wherein said at least one cut vegetable is selected from the group consisting of lettuce, celery, green onions, broccoli, cauliflower, parsley and cabbage.

33. A sealed package containing at least one vegetable and an initial modified atmosphere comprising at least about 25% oxygen by volume, at least about 3% carbon monoxide by volume, and the balance substantially all molecular nitrogen, said package having permeabilities to oxygen, carbon monoxide and carbon dioxide at least as high as low density polyethylene having a thickness not greater than about 2 mils.

34. The package of claim 33 wherein said atmosphere comprises at least about 40% oxygen by volume.

35. The package of claim 34 wherein said vegetable is lettuce.

36. The package of claim 35 wherein said package is made of flexible sheet material.

37. The package of claim 33 wherein the vegetable is lettuce.

38. The package of claim 33 wherein said package and its contents are maintained at a temperature below about 45° F. but above the freezing point of the moisture in said at least one vegetable.

39. The package of claim 33 wherein said at least one vegetable is selected from the group consisting of lettuce, celery, green onions, broccoli, cauliflower, parsley and cabbage.

40. A sealed package containing at least one cut vegetable and an initial modified atmosphere comprising at least about 25% oxygen by volume, at least about 3% carbon monoxide by volume, and the balance substantially all molecular nitrogen, said package having permeabilities to oxygen, carbon monoxide and carbon dioxide at least as high as low density polyethylene having a thickness not greater than about 2 mils.

41. The package of claim 38 wherein said atmosphere comprises at least about 40% oxygen by volume.

42. The package of claim 39 wherein said cut vegetable is lettuce.

43. The package of claim 40 wherein said package is made of flexible sheet material.

44. The package of claim 38 wherein the cut vegetable is lettuce.

45. The package of claim 38 wherein said package and its contents are maintained at a temperature below about 45° F. but above the freezing point of the moisture in said at least one cut vegetable.

46. The package of claim 38 wherein said at least one cut vegetable is selected from the group consisting of lettuce, celery, green onions, broccoli, cauliflower, parsley and cabbage.

47. A sealed package having a permeability to oxygen of at least about 500 cc per 100 square inches of package surface per 24 hours per mil of package thickness, and having permeabilities to each of carbon monoxide and carbon dioxide of at least about 1,350 cc per 100 square inches of sealable package surface per 24 hours per mil of package thickness, said package containing at least one vegetable and an initial modified atmosphere comprising at least about 25% oxygen by volume, at least about 3% carbon monoxide by volume, and the balance substantially all molecular nitrogen.

48. A sealed package having a permeability to oxygen of at least about 500 cc per 100 square inches of sealable package surface per 24 hours per mil of package thickness, and having permeabilities to carbon monoxide and carbon dioxide of at least about 1,350 cc per 100 square inches of package surface per 24 hours per mil of package thickness, said package containing at least one cut vegetable and an initial modified atmosphere comprising at least about 25% oxygen by volume, at least about 3% carbon monoxide by volume, and the balance substantially all molecular nitrogen.

* * * * *